Nov. 22, 1966  M. A. TRUELOCK ETAL  3,286,534
PISTON TYPE VIBRATOR

Filed Oct. 13, 1964  3 Sheets-Sheet 1

INVENTORS
MARVIN A. TRUELOCK,
HARRISON KEYS & MERLE M. ROSE
BY
Mason, Fenwick, & Lawrence
ATTORNEYS INVENTORS
MARVIN A. TRUELOCK,
HARRISON KEYS & MERLE M. ROSE
BY
Mason, Fenwick & Lawrence
ATTORNEYS

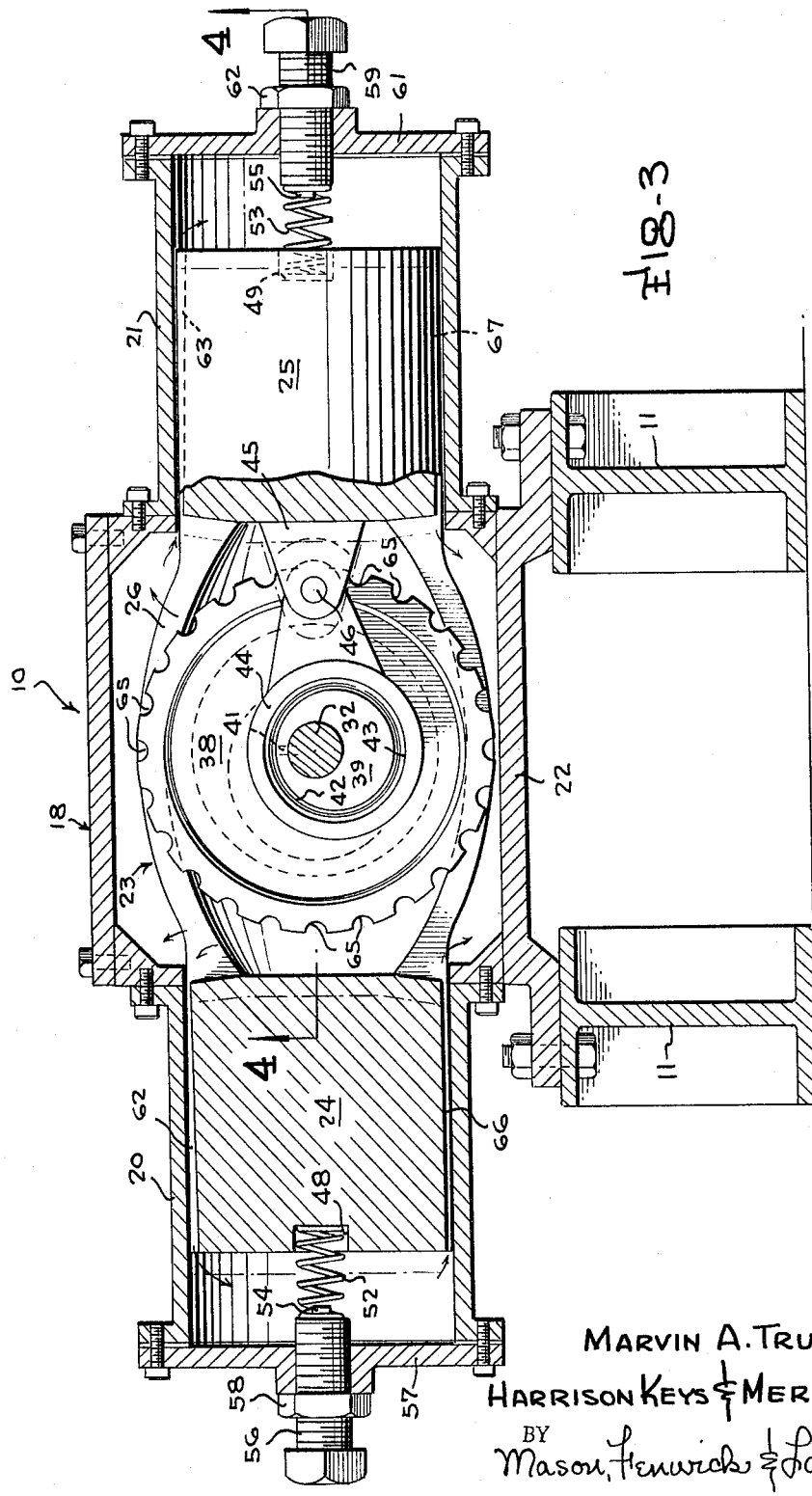

United States Patent Office 3,286,534
Patented Nov. 22, 1966

3,286,534
PISTON TYPE VIBRATOR
Marvin A. Truelock, Southland, Harrison Keys, Slaton, and Merle M. Rose, Lubbock, Tex., assignors to Big Eight Implement Company, Lubbock, Tex., a corporation of Texas
Filed Oct. 13, 1964, Ser. No. 403,516
7 Claims. (Cl. 74—44)

This invention pertains in general to vibrators and more particularly to means of utilizing a specific type vibrator with soil and rock moving equipment.

It has been found that on many types of soil and rock moving equipment the efficiency of moving the earth is increased many fold by setting up vibrations of particular frequency within the equipment, thereby transmitting vibration to the soil engaging portions of the equipment. It has also been found that providing the soil moving equipment with various types of vibrators now on the open market there are certain deficiencies inherent in the operating range of these vibrators. There is a distinct advantage in using a vibrator having a variable frequency range which may be controlled by the operator to give optimum results in various types of soil and rocks.

Therefore, an object of this invention is the provision of means to transmit vibratory motion to soil engaging implements to permit easier and faster movement of soils and rocks.

Another object of this invention is the provision of a novel type of opposed piston vibrator adapted to be attached to a plow or other soil engaging implement.

Another object of this invention is the provision of a vibrator which is inexpensive, easy to manufacture, and simple to use for the purposes above described.

Other objects, advantages and capabilities of the invention will become apparent from the following description, taken in conjunction with the accompanying drawings showing only a preferred embodiment of the invention.

In the drawings:

FIGURE 3 is a vertical section view of the vibrator taken along lines 3—3 of FIGURE 2.

Figure 1:
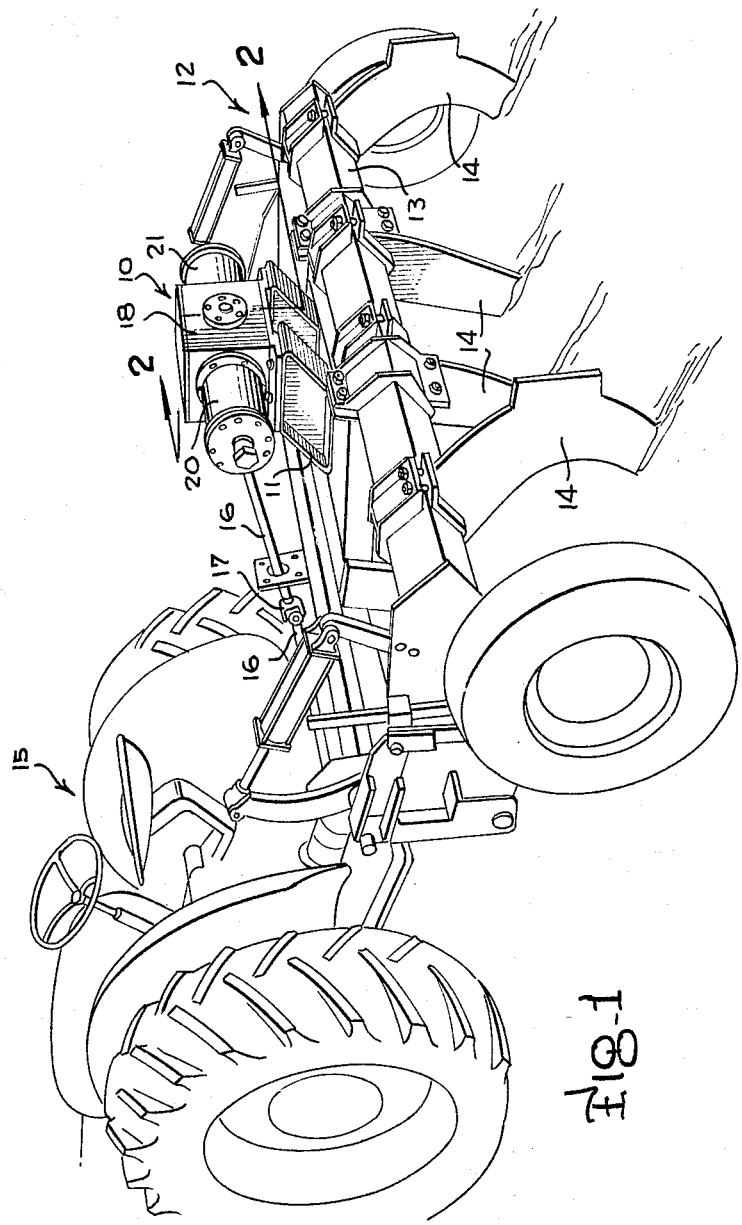
FIGURE 1 is a perspective view showing the vibrator of the present invention mounted upon a chisel type plow which is connected to a common type of farm tractor.

Referring now to the drawings wherein corresponding parts of the present invention are designated by common numerals throughout, and particularly to FIGURE 1, the vibrator assembly is designated generally by the numeral 10. The vibrator is supported by tool bar supports 11 upon the chisel type plow generally indicated by numeral 12. This type of plow has at least one transversely extending tool bar 13 upon which is mounted a suitable number of chisel shanks 14 for engagement with the soil. The plow 12 is hitched to the tractor 15 from which the vibrator assembly takes its operative power from the tractor power. This may be accomplished by a suitable takeoff shaft 16 through a plurality of universal joints 17.

The exterior of the vibrator assembly 10 generally comprises a central housing and oil pan 18 and a pair of opposed piston cylinders 20, 21 which are mounted upon the central housing 18. Forming the bottom portion of the vibrator assembly and acting as an oil pan by which the vibrator assembly is mounted upon the tool bar support 11 is a housing support 22. It should be recognized at this time that the present invention could, if desired, be limited to only one piston housing and one included piston. However, the invention will be described as having a pair of each since in actual practice this procedure is found to operate extremely well.

Mounted within the central housing 18 in the piston cylinders 20, 21 is a one piece assembly 23. In the embodiment shown herein the piston assembly 23 is shown and described as a one piece assembly since applicants have found that this type of assembly is preferable for numerous reasons. However, a piston assembly having two or more parts may be used and the invention should not be limited more narrowly than this. Comprising the piston assembly 23 are pistons 24 and 25 which are interconnected by an enlarged internally hollow concave center member 26. At the top and bottom of center member 26 are elongated apertures 27, 28 with the top aperture 27 being called the "top oiler gear aperture" and the bottom one being known as the "bottom oiler gear aperture." At the opposed sides of the concave center member 26 are suitable drive shaft apertures 29, 31.

The power drive shaft 32 extends from the nearest universal joint 17 through the central housing 18 transversely to the longitudinal axis of the piston assembly 23. The shaft 32 is suitably journaled by bearings 33, 34 located within bearing housings 35, 36 each of which are mounted fixedly upon the central housing 18.

Figure 2:
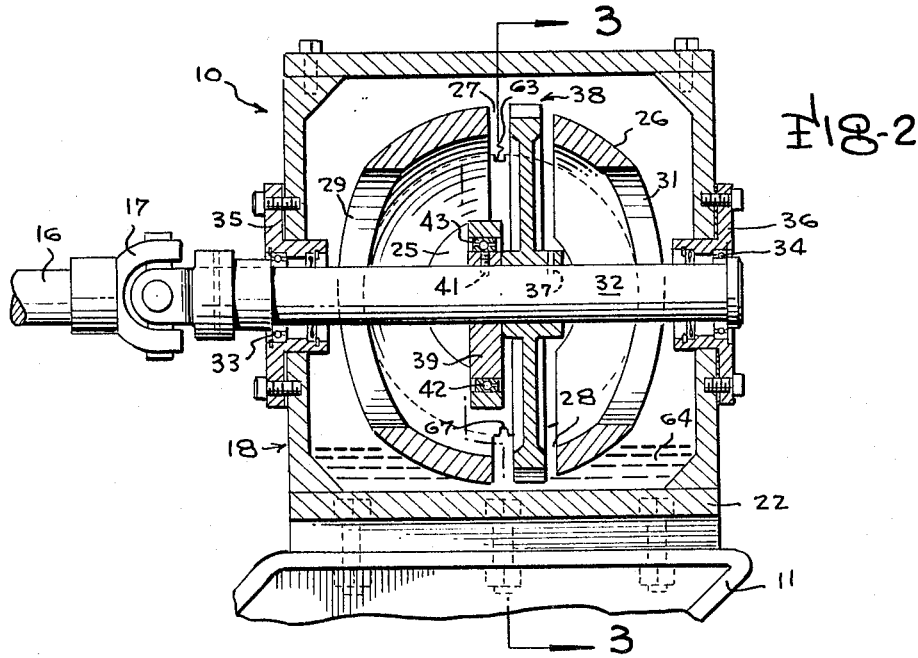
FIGURE 2 is a vertical section view of the vibrator of the present invention taken along lines 2—2 of FIGURE 1.
Figure 4:
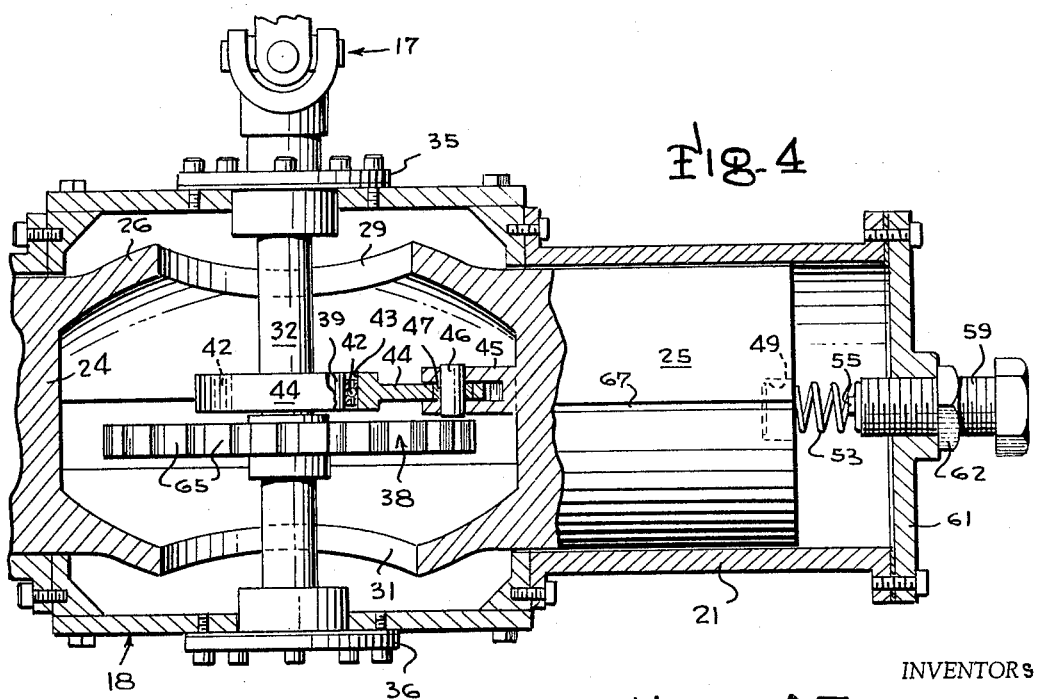
FIGURE 4 is a horizontal section view of a portion of the present vibrator taken along lines 4—4 of FIGURE 3 looking upwardly.

Mounted slightly off center within the central housing 18 and fixed upon shaft 32 by means of a set screw 37 is oiler gear 38. As seen in FIGURES 2 and 3 oiler gear 38 extends through both oiler gear apertures 27, 28 for a purpose to be later described. Located centrally of shaft 32 and adjacent oiler gear 38 is eccentric 39. The eccentric 39 is fixedly mounted to the shaft by means of a suitable set screw 41 which projects a sufficient distance into the shaft to properly locate the eccentric. About the periphery of the eccentric 39 is a ball and race bearing mechanism 42 which allows relative rotation between the eccentric and the circular bearing surface 43 of the connecting rod 44. The connecting rod 44 projects axially along the center line axis of one of the opposed pistons (in this case piston 25) and interconnects with piston rod 45 which is firmly attached to the interior bottom surface of piston 25. Maintaining the connecting rod 44 and piston rod 45 in operative relationship is wrist pin 46. The wrist pin 46 is fixed within the U shaped piston rod and through an aperture in the connecting rod which embodies a sufficient bearing surface 47. Such a construction allows the connecting rod to have relative movement to the wrist pin 46 without undue frictional losses.

The outermost end of the piston 24 has a recessed spring receiving well 48. Within this well is compression spring 52 which fits at its remote end about a boss member 54 protruding from a spring tension adjustment bolt 56 which is threaded through the cylinder head 57 and held against rotative movement by jamb nut 58. In some cases it may be desired to use two springs at the piston end for longer spring life and better tension adjustment.

Similar structure is found at the other side of the vibrator assembly wherein the piston 25 has a spring well 49 and a spring 53 fitting about a boss member 55 that is the axial projection of spring tension adjustment bolt 59 which is threaded through cylinder head 61 and positioned by jamb nut 62.

Within the tops of pistons 24 and 25 are oiler grooves 62, 63 which are adapted to receive oil 64 by the rotation of oiler gear 38 as it moves through the oil reservoir 64. Moving through the oil reservoir with a circular motion it picks up a quantity of oil within the oil cups 65 and splashes it against the top of the central housing 18 which allows the oil then to run down into the oil grooves 62, 63 to lubricate each piston and cylinder bore. To return the oil 64 to the reservoir each of the pistons have a return oil groove. In the case herein groove 66 is for piston 24 and groove 67 for piston 25.

In operation of the present invention power transmitted from the tractor drives the shaft 32 which in turn rotates the eccentric 39. Since the eccentric is fixed to the shaft, the piston rod 44 is moved in an axially reciprocative movement as shown in the phantom lines in FIGURE 3. Since both pistons 24 and 25 are interconnected in a one piece assembly, the resultant movement of the eccentric is transmitted to both pistons. Once the great mass of the pistons begin to move reciprocatively within the central housing and piston cylinders the entire vibration assembly will tend to assume a sympathetic vibration with the piston assembly. Such a motion is a well known phenomena of physics and may be found in any basic physics book. Compression springs 52, 53 maintain a sufficient compressive force against the piston so that once power is terminated to the shaft 32 a constant load may be maintained upon the shaft to prevent any damage occurring to the shaft from the mass of the pistons attempting to maintain an off center reciprocative movement. Once the entire vibration assembly is vibrating at a desired frequency, which is controlled solely by the r.p.m.'s of the tractor power take off shaft 16, the vibrations will be transmitted to the soil and rock engaging implement 12 in the desired manner. Such a vibratory motion obviously will aid in the movement of earth that is being operated upon.

Referring to the drawings, and especially to FIGURES 2 and 3, it should be noted that the top oil grooves 62, 63 inclined along their length so that the lubricating oil 64 flows toward the cylinder heads 57, 61. Normally the space between the piston tops and the cylinder heads is substantially full of oil to provide an added damping factor to the springs 52, 53. Therefore, as the pistons reciprocate away from the cylinder heads there is a slight vacuum created which draws the oil into the space between the pistons and the heads. Conversely, the grooves 66, 67 slope toward the oil pan and it follows that when the pistons reciprocate toward the heads oil will be forced back to the oil pan.

From the foregoing, applicant has shown not only how the desired vibratory motion may aid in the movement of earth but has also shown a particularly novel device for effecting such a movement. Such a device having the desired features as mentioned in the objects of this invention will at once become well accepted within the art and have outstanding commercial success.

While I have particularly shown and described one particular embodiment of the invention, it is distinctly understood that the invention is not limited thereto but that modifications may be made within the scope of the invention and such variations as are covered by the scope of the appended claims.

What is claimed is:

1. A vibrator assembly for use with soil engaging implements to improve the efficiency with which soil is moved comprising a drive shaft housing adapted to have an oil reservoir therein, at least one piston cylinder and associated cylinder head protruding from the drive shaft housing, a one piece piston assembly mounted in the drive shaft housing and the piston cylinder and being adapted for reciprocative movement therein, the piston assembly having at least one piston interconnected with an enlarged internally hollow concave center member, spring means in compression between the cylinder head and the associated piston so that a desired compressive force is maintained upon the piston at all times, a drive shaft projecting through the drive shaft housing transverse to the axial length of the piston assembly, bearing means in the drive shaft housing supporting the drive shaft, means for supplying lubricating oil to the piston assembly, an eccentric mounted on the shaft, means for interconnecting the eccentric with the piston assembly whereby when the drive shaft revolves the eccentric the piston assembly is caused to reciprocate thereby transmitting sympathetic vibration to the entire vibrator assembly causing the vibrations to be induced to the soil engaging implement.

2. A vibrator assembly comprising a central housing adapted to have an oil reservoir therein, a pair of piston cylinders and associated cylinder heads protruding from the central housing at opposed sides thereof, a one piece piston assembly mounted in the central housing and the piston cylinders and being adapted for reciprocative movement therein, the piston assembly having a pair of opposed pistons interconnected by an enlarged internally hollow concave center member, spring means in compression between each cylinder head and the associated piston so that a desired compressive force is maintained upon the pistons at all times, a drive shaft projecting through the central housing transverse to the axial length of the piston assembly, bearing means in the central housing supporting the drive shaft, means for supplying lubricating oil to the piston assembly, an eccentric mounted on the shaft, means for interconnecting the eccentric with the piston assembly whereby when the drive shaft revolves the eccentric the piston assembly is caused to reciprocate thereby transmitting sympathetic vibrations to the entire vibrator assembly.

3. A vibrator assembly comprising a central housing adapted to have an oil reservoir therein, a pair of piston cylinders and associated cylinder heads protruding from the central housing at opposed sides thereof, a one piece piston assembly mounted in the central housing and the piston cylinders and being adapted for reciprocative movement therein, the piston assembly having a pair of opposed pistons interconnected by an enlarged internally hollow concave center member, the pistons having longitudinal oil grooves for lubricating the cylinder walls, spring means in compression between each cylinder head and the associated piston so that a desired compressive force is maintained upon the pistons at all times, a drive shaft projecting through the central housing transverse to the axial length of the piston assembly, bearing means in the central housing supporting the drive shaft, means for supplying lubricating oil to the piston assembly, an eccentric mounted on the shaft, means for interconnecting the eccentric with the piston assembly whereby when the drive shaft revolves the eccentric the piston assembly is caused to reciprocate thereby transmitting sympathetic vibrations to the entire vibrator asembly.

4. A vibrator assembly comprising a central housing adapted to have an oil reservoir therein, a pair of piston cylinders and associated cylinder heads protruding from the central housing at opposed sides thereof, a one piece piston assembly mounted in the central housing and the piston cylinders and being adapted for reciprocative movement therein, the piston assembly having a pair of opposed pistons interconnected by an enlarged internally hollow concave center member, the pistons having longitudinal oil grooves for lubricating the cylinder walls, a spring receiving well in the remote end of each piston, compression spring having one end positioned in each spring receiving well and the other end protruding therefrom, an adjustable screw means threaded through each piston cylinder head along the axial length of the piston assembly and extending into the interior of the cylinder, boss means projecting from each of the screw means and adapted to mate with the other end of each spring so that a desired compressive force is maintained upon the pistons at all times, a drive shaft projecting through the central housing transverse to the axial length of the piston assembly, bearing means in the central housing supporting the drive shaft, means for supplying lubricating oil to the piston assembly, an eccentric mounted on the shaft, means for interconnecting the eccentric with the piston assembly whereby when the drive shaft revolves the eccentric the piston assembly is caused to reciprocate thereby transmitting sympathetic vibrations to the entire vibrator assembly.

5. A vibrator assembly comprising a central housing adapted to have an oil reservoir therein, a pair of piston cylinders and associated cylinder heads protruding from the central housing at opposed sides thereof, a one piece piston assembly mounted in the central housing and the piston cylinders and being adapted for reciprocative movement therein, the piston assembly having a pair of opposed pistons interconnected by an enlarged internally hollow concave center member, the pistons having longitudinal oil grooves for lubricating the cylinder walls, spring means in compression between each cylinder head and the associated piston so that a desired compressive force is maintained upon the pistons at all times, a drive shaft projecting through the central housing transverse to the axial length of the piston assembly, bearing means in the central housing supporting the drive shaft, an oiler gear mounted for rotation with the drive shaft, the gear having a plurality of oil carrying cups about its periphery for carrying oil from the oil reservoir to the piston oil grooves, an eccentric mounted on the shaft, means for interconnecting the eccentric with the piston assembly whereby when the drive shaft revolves the eccentric the piston assembly is caused to reciprocate thereby transmitting sympathetic vibrations to the entire vibrator assembly.

6. A vibrator assembly comprising a central housing adapted to have an oil reservoir therein, a pair of piston cylinders and associated cylinder heads protruding from the central housing at opposed sides thereof, a one piece piston assembly mounted in the central housing and the piston cylinders and being adapted for reciprocative movement therein, the piston assembly having a pair of opposed pistons interconnected by an enlarged internally hollow concave center member, spring means in compression between each cylinder head and the associated piston so that a desired compressive force is maintained upon the pistons at all times, a drive shaft projecting through the central housing transverse to the axial length of the piston assembly, bearing means in the central housing supporting the drive shaft, means for supplying lubricating oil to the piston assembly, an eccentric mounted on the shaft, bearing means positioned about the periphery of the eccentric, a piston rod extending inwardly toward the central housing from one of the pistons, a connecting rod interconnecting the piston rod with the eccentric, the connecting rod having an enlarged aperture at one end that encompasses the peripheral bearing means of the eccentric whereby when the drive shaft revolves the eccentric the piston assembly is caused to reciprocate thereby transmitting sympathetic vibrations to the entire vibrator assembly.

7. A vibrator assembly comprising a central housing adapted to have an oil reservoir therein, a pair of piston cylinders and associated cylinder heads protruding from the central housing at opposed sides thereof, a one piece piston assembly mounted in the central housing and the piston cylinders and being adapted for reciprocative movement therein, the piston assembly having a pair of opposed pistons interconnected by an enlarged internally hollow concave center member, the pistons having longitudinal oil grooves for lubricating the cylinder walls, a spring receiving well in the remote end of each piston, compression spring having one end positioned in each spring receiving well and the other end protruding therefrom, an adjustable screw means threaded through each piston cylinder head along the axial length of the piston assembly and extending into the interior of the cylinder, boss means projecting from each of the screw means and adapted to mate with the other end of each spring, so that a desired compressive force is maintained upon the pistons at all times, a drive shaft projecting through the central housing transverse to the axial length of the piston assembly, bearing means in the central housing supporting the drive shaft, an oiler gear mounted for rotation with the drive shaft, the gear having a plurality of oil carrying cups about its periphery for carrying oil from the oil reservoir to the piston oil grooves, an eccentric mounted on the shaft, bearing means positioned about the periphery of the eccentric, a piston rod extending inwardly toward the central housing from one of the pistons, a connecting rod interconecting the piston rod with the eccentric, the connecting rod having an enlarged aperture at one end that encompasses the peripheral bearing means of the eccentric whereby when the drive shaft revolves the eccentric the piston assembly is caused to reciprocate thereby transmitting sympathetic vibrations to the entire vibrator assembly.

References Cited by the Examiner

UNITED STATES PATENTS

| | | | |
|---|---|---|---|
| 1,654,815 | 1/1928 | Jubien | 74—61 X |
| 2,170,099 | 8/1939 | Stubings | 74—44 X |
| 2,335,362 | 11/1943 | Schroepfer | 74—44 |
| 2,902,867 | 9/1959 | Giertz-Hedstrom | 74—61 |

FRED C. MATTERN, JR., *Primary Examiner.*

F. E. BAKER, *Assistant Examiner.*